(12) United States Patent
Clapper et al.

(10) Patent No.: US 8,137,807 B2
(45) Date of Patent: Mar. 20, 2012

(54) PRESSURE-SENSITIVE ADHESIVES DERIVED FROM 2-ALKYL ALKANOLS

(75) Inventors: Jason D. Clapper, Lino Lakes, MN (US); Kevin M. Lewandowski, Inver Grove Heights, MN (US); Jingjing Ma, Cottage Grove, MN (US); Zhong Chen, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 62 days.

(21) Appl. No.: 12/732,406

(22) Filed: Mar. 26, 2010

(65) Prior Publication Data

US 2011/0237725 A1    Sep. 29, 2011

(51) Int. Cl.
*B32B 7/12* (2006.01)
*B32B 27/30* (2006.01)

(52) U.S. Cl. ............... 428/355 AC; 524/270; 524/556; 524/560; 524/561

(58) Field of Classification Search ............ 428/355 AC; 524/270, 556, 560, 561; 526/317.1, 318.4, 526/319, 328
See application file for complete search history.

(56) References Cited

U.S. PATENT DOCUMENTS

| | | |
|---|---|---|
| 3,691,140 A | 9/1972 | Silver |
| 4,166,152 A | 8/1979 | Baker et al. |
| 4,619,979 A | 10/1986 | Kotnour et al. |
| 4,636,432 A | 1/1987 | Shibano et al. |
| 4,656,218 A | 4/1987 | Kinoshita |
| 4,843,134 A | 6/1989 | Kotnour et al. |
| 5,045,569 A | 9/1991 | Delgado |
| 5,602,221 A | 2/1997 | Bennett et al. |
| 5,637,646 A | 6/1997 | Ellis |
| 5,648,425 A | 7/1997 | Everaerts et al. |
| 5,804,610 A | 9/1998 | Hamer et al. |
| 6,419,797 B1 | 7/2002 | Scherf et al. |
| 6,746,993 B2 | 6/2004 | Yuki et al. |

FOREIGN PATENT DOCUMENTS

| | | |
|---|---|---|
| EP | 2 072 594 | 6/2009 |
| JP | 10279527 | 1/1998 |
| JP | 2004143420 | 5/2004 |
| JP | 2005307082 | 11/2005 |
| JP | 3842829 | 11/2006 |
| WO | WO 2009/154856 | 12/2009 |
| WO | WO 2009154856 A1 * | 12/2009 |

OTHER PUBLICATIONS

Machine translation of JP2004143420 A.*
English abstract of JP102799527 A.*
STN Structure Search Results (Jul. 7, 2011).*
PCT International Search Report for International Application No. PCT/US2011/028420.

* cited by examiner

*Primary Examiner* — David W Wu
*Assistant Examiner* — Vu A Nguyen
(74) *Attorney, Agent, or Firm* — Kent S. Kokko

(57) ABSTRACT

Pressure-sensitive adhesives are prepared from (meth)acrylate esters of 2-alkyl alkanols. The adhesives are characterized by exhibiting an overall balance of adhesive and cohesive characteristics and exceptional adhesion to low surface energy substrates.

17 Claims, No Drawings

PRESSURE-SENSITIVE ADHESIVES DERIVED FROM 2-ALKYL ALKANOLS

TECHNICAL FIELD OF THE INVENTION

This invention relates to pressure-sensitive adhesives and tape articles prepared therefrom. The tapes are characterized by exhibiting an overall balance of adhesive and cohesive characteristics and exceptional adhesion to low surface energy substrates.

BACKGROUND OF THE INVENTION

Pressure-sensitive tapes are virtually ubiquitous in the home and workplace. In its simplest configuration, a pressure-sensitive tape comprises an adhesive and a backing, and the overall construction is tacky at the use temperature and adheres to a variety of substrates using only moderate pressure to form the bond. In this fashion, pressure-sensitive tapes constitute a complete, self-contained bonding system.

According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests which are designed to individually measure tack, adhesion (peel strength), and cohesion (shear holding power), as noted in A. V. Pocius in Adhesion and Adhesives Technology: An Introduction, 2$^{nd}$ Ed., Hanser Gardner Publication, Cincinnati, Ohio, 2002. These measurements taken together constitute the balance of properties often used to characterize a PSA.

With broadened use of pressure-sensitive tapes over the years, performance requirements have become more demanding. Shear holding capability, for example, which originally was intended for applications supporting modest loads at room temperature, has now increased substantially for many applications in terms of operating temperature and load. So-called high performance pressure-sensitive tapes are those capable of supporting loads at elevated temperatures for 10,000 minutes. Increased shear holding capability has generally been accomplished by crosslinking the PSA, although considerable care must be exercised so that high levels of tack and adhesion are retained in order to retain the aforementioned balance of properties.

There are a wide variety of pressure sensitive adhesive (PSA) materials available today that include natural crude or synthetic rubbers, block copolymers, and acrylic ester based polymeric compositions. Acrylic ester PSAs in particular have been the focus of a great deal of development over the last half century as the performance demands for PSAs have increased. Acrylic based PSAs may be closely tailored to provide a number of desired attributes such as elasticity, tackiness, transparency, resistance to oxidation and sunlight, etc., as well as have the necessary degree of adhesion and cohesion for demanding tape applications.

Central to all PSAs is a desired balance of adhesion and cohesion that is often achieved by optimizing the physical properties of the acrylic elastomer, such as glass transition temperature and modulus. For example, if the glass transition temperature ($T_g$) or modulus of the elastomer is too high and above the Dahlquist criterion for tack (storage modulus of $3\times10^6$ dynes/cm$^2$ at room temperature and oscillation frequency of 1 Hz), the material will not be tacky and is not useful by itself as a PSA material. Often in this case, low molecular weight, high $T_g$ resin polymers (tackifiers) or low molecular weight, low $T_g$ polymers (plasticizers) are often used to modulate the $T_g$ and modulus into an optimal PSA range.

Acrylic ester PSAs of today are typically an elastomeric polymer comprised primarily of a low $T_g$ non-polar monomer, as well as a small amount of polar acrylic monomer such as acrylic acid. Two widely used low $T_g$ acrylates in PSAs are 2-ethylhexyl acrylate (EHA) and isooctyl acrylate (IOA), each providing an alkyl chain of eight carbon atoms ($C_8$). Longer or shorter alkyl chains have a number of disadvantages in terms of PSA performance. For example, shorter alkyl chain (e.g. butylacrylate-$C_4$) will significantly increase both the $T_g$ and modulus of the elastomer, possibly increasing the room temperature storage modulus above $3\times10^6$ dynes/cm$^2$. Alternatively, longer alkyl chains (e.g. lauryl acrylate-$C_{12}$) can lead to crystalline groups within the polymer that will also significantly reduce it degree of tack.

SUMMARY OF THE INVENTION

The adhesive compositions of this disclosure relate to the novel characteristics of Guerbet alkanol-derived (meth) acrylic monomers to their ability to form (co)polymers with unique and improved properties over comparable, commonly used PSA acrylate (co)polymers. These properties include a very low $T_g$, a low solubility parameter for acrylic polymers, and a low storage modulus creating a very conformable elastomer. This combination of properties provides PSAs with enhanced adhesion to low surface energy substrates as compared to current acrylic PSA compositions.

The adhesive (co)polymers of this disclosure comprise (meth)acrylate ester (co)polymers of 2-alkyl alkanols (Guerbet alkanols) wherein the carbon number molar average of said alkanols is 12 to 32 ($C_{12}$-$C_{32}$). The adhesive (co)polymers may further comprise (meth)acrylic acid ester monomer of $C_1$-$C_{12}$ alkanols ("$C_{1-12}$ alkanols"), wherein the carbon number molar average of the alkanols of all such (meth) acrylic acid ester monomers ((meth)acrylates of Guerbet alkanols and (meth)acrylic acid ester monomers of $C_{1-12}$ alkanols) is 12 to 20 ($C_{12}$-$C_{20}$).

In one aspect the pressure-sensitive adhesive comprises the interpolymerized reaction product of: (a) at least one monomer selected from the group consisting of a (meth)acrylic acid ester monomers of 2-alkyl alkanols; optionally (b) (meth)acrylic acid ester monomers of $C_1$-$C_{12}$ alkanols, optionally (c) a acid functional ethylenically unsaturated monomers; optionally d) non-acid functional, ethylenically unsaturated polar monomers; optionally e) vinyl monomers, and optionally (f) non-acid functional, ethylenically a multifunctional (meth)acrylates.

As used herein the term "(meth)acrylic" or "(meth)acrylate" is inclusive of both acrylic and methacrylic (or acrylate and methacrylate).

As used herein "$C_1$-$C_{12}$ alkanol (meth)acrylate" refers to (meth)acrylate esters of $C_{12}$ alkanols.

As used herein "Guerbet (meth)acrylate" or "2-alkyl (meth)acrylate refers to (meth)acrylate esters of 2-alkyl alkanols.

The pressure-sensitive adhesives of the present invention may optionally comprise other monomers, crosslinkers, and other additives. In particular, the pressure sensitive adhesive may further comprise a tackifier.

The pressure-sensitive adhesives of this disclosure provide the desired balance of tack, peel adhesion, and shear holding power, and further conform to the Dahlquist criteria; i.e. the modulus of the adhesive at the application temperature, typically room temperature, is less than $3 \times 10^6$ dynes/cm at a frequency of 1 Hz.

Another embodiment of the present invention is a substrate coated with the pressure-sensitive adhesives of the present invention.

DETAILED DESCRIPTION

The pressure-sensitive adhesives of the present invention are (meth)acrylate adhesives comprising at least one monomer derived from a 2-alkyl alkanol: i.e. a Guerbet alkanol. The pressure-sensitive adhesives may further comprise at least one (meth)acrylic acid ester of a $C_1$-$C_{12}$ alkanol, at least and one or more acid-functional monomers and optionally one or more non-acid functional polar monomers. The pressure-sensitive adhesives of the present invention optionally comprise other monomers which may be added to improve the physical properties of the adhesives, such as crosslinkers, and other additives such as tackifiers or plasticizers.

The molar carbon number average of said 2-alkyl alkanols of the Guerbet (meth)acrylates is 12 to 32 ($C_{12}$-$C_{32}$), preferably 12 to 20 ($C_{12}$-$C_{20}$). When the optional b) $C_{1-12}$ alkanol (meth)acrylates are present, the carbon number molar average of the alkanols of the a) and b) (meth)acrylic acid ester is 12 to 20 ($C_{12}$-$C_{20}$). The carbon number molar average may be calculated by summing the number of moles of each alkanol (Guerbet and $C_{1-12}$ alkanols) multiplied by the carbon number of each alkanol, and dividing the result by the total number of moles of alkanols:

$$\frac{\sum_{\alpha-\omega}[(\text{Moles of alkanol}) \times (\text{\# carbon atoms for alkanol})]}{\text{\# moles of alkanols } \alpha \text{ to } \omega}$$

The (meth)acrylic acid ester monomer of 2-alkyl alkanols are derived from $C_{12}$-$C_{32}$ Guerbet alkanols, preferably $C_{12}$-$C_{20}$ Guerbet alkanols. These Guerbet alkanols may be obtained by base-catalyzed self-condensation of linear and/or branched alkanols containing 4 to 14 and preferably 6 to 12 carbon atoms. Primary or secondary alkanols may be used in the preparation of Guerbet alkanols.

It is known in the art that Guerbet alkanols may be formed from the same or different alkanols i.e. a homo or hetero system. That is, a Guerbet alkanol is the condensation product of two alkanol molecules joined at the beta carbon of the alkanol which has retained the hydroxyl functionality; i.e. 2-alkyl alkanols. The resultant product is therefore a branched primary alkanol containing a single hydroxyl group. It is possible to use mixtures of starting materials in the Guerbet reaction and condense them into mixtures of alkanol products. It is also possible to obtain products which are Guerbet alkanols from a short chained alkanol. It is desired for reasons of polarity, $T_g$ and modulus that Guerbet alkanols having a molar carbon number average between 12-32 be used. An overview of Guerbet alkanols was published by A. J. O'Lennick in Soap Cosm. Chem. Spec. (April) 52 (1987). Reference may also be made to U.S. Pat. No. 6,419,797 (Sherf et al.) for method to produce Guerbet alkanols.

The (meth)acrylate ester monomer derived from the Guerbet alkanols is of the formula:

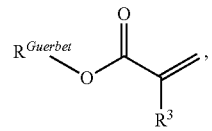

I

Wherein
$R^{Guerbet}$ is derived from a $C_{12}$-$C_{32}$ 2-alkyl alkanol, i.e. an alkyl groups branched at the 2 position; and
$R^3$ is H or $CH_3$.

Preferably, the (meth)acrylate ester monomer derived from the Guerbet alkanols is of the formula:

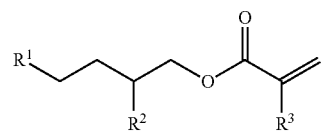

II wherein
$R^1$ and $R^2$ are each independently $C_4$ to $C_{14}$ saturated, and branched or linear alkyl; and
$R^3$ is H or $CH_3$.

The adhesive compositions may comprise Guerbet (meth)acrylate homopolymers, In many preferred embodiments, the adhesive copolymer comprises 51-99 parts by weight of Guerbet (meth)acrylates, relative to 100 parts total monomer.

Preferably, the Guerbet alkanol is derived from linear alkanols, i.e. $R^1$ and $R^2$ are linear alkyl groups. It has been found that such (meth)acrylate esters of "linear Guerbet alkanols" provide a lower $T_g$ and storage modulus compared to monomers where $R^1$ and $R^2$ are branched. The $T_g$ of the resulting adhesive (co)polymers is $\leq -20°$ C., preferably $\leq -30°$ C., most preferably $\leq -40°$ C.

The pressure-sensitive adhesive copolymer may further comprise interpolymerized monomer units of $C_1$-$C_{12}$ (meth)acrylate ester monomers. Examples of monomers suitable for use as the $C_1$-$C_{12}$ (meth)acrylate ester monomer include the esters of either acrylic acid or methacrylic acid with non-tertiary alkanols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, citronellol, dihydrocitronellol, and the like. In some embodiments, the preferred (meth)acrylate ester monomer is the ester of (meth)acrylic acid with butyl alcohol or isooctyl alcohol, or a combination thereof, although combinations of two or more different (meth)acrylate ester monomer are suitable.

In some embodiments, this disclosure provides an adhesive composition derived from renewable resources. In particular, the present invention provides an adhesive composition derived, in part, from plant materials. In some embodiments, the present invention further provides an adhesive article, wherein the substrate or backing is also derived from renewable resources. The increase in the price of oil, and concomitant petroleum-derived products, has led to volatile prices and supply for many adhesive products. It is desirable to replace all or part of the petroleum-based feedstocks with those derived from renewable sources, such as plants, as such materials become relatively cheaper, and are therefore both economically and socially beneficial. Therefore, the need for such plant-derived materials has become increasingly significant. Many of the (meth)acrylate monomers used herein may be derived from renewable resources. In some embodiments, the preferred (meth)acrylate ester monomer is the ester of (meth)acrylic acid with an alkanol derived from a renewable source, such as 2-octanol, citronellol, dihydrocitronellol and Guerbet alkanols derived from renewable materials.

In some embodiments it is desirable for the $C_1$-$C_{12}$ (meth)acrylate ester monomer to include a high $T_g$ monomer, have a $T_g$ of at least 25° C., and preferably at least 50° C. Examples of suitable monomers useful in the present invention include, but are not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5-trimethylcyclohexyl acrylate, cyclohexyl acrylate, N-octyl acrylamide, and propyl methacrylate or combinations.

If present, the $C_1$-$C_{12}$ (meth)acrylate ester monomer is present in an amount of 1 to 49 parts by weight, based on 100 parts total monomers. Most preferably $C_1$-$C_{12}$ (meth)acrylate ester monomer is present in an amount of 5 to 45 parts by weight based on 100 parts total monomers. When high $T_g$ monomers are included, the copolymer may include up to 50 parts by weight, preferably up to 10 to 20 parts by weight relative to 100 parts by weight of $C_1$-$C_{12}$ (meth)acrylate ester monomer component.

The pressure-sensitive adhesive copolymer may further comprise an acid functional monomer, where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl(meth)acrylate, 2-sulfoethyl methacrylate, styrene sulfonic acid, 2-acrylamido-2-methylpropanesulfonic acid, vinylphosphonic acid, and mixtures thereof.

Due to their availability, acid functional monomers of the acid functional copolymer are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. The acid functional monomer is generally used in amounts of 0 to 15, preferably 0.5 to 15, most preferably 0.5 to 5, parts by weight, based on 100 parts by weight total monomer. The pressure-sensitive adhesive copolymer may further comprise polar monomers.

The polar monomers useful in preparing the copolymer are both somewhat oil soluble and water soluble, resulting in a distribution of the polar monomer between the aqueous and oil phases in an emulsion polymerization. As used herein the term "polar monomers" are exclusive of acid functional and ketone monomers.

Representative examples of suitable polar monomers include but are not limited to 2-hydroxyethyl(meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl)(meth)acrylates including 2-(2-ethoxyethoxy)ethyl(meth)acrylate, 2-ethoxyethyl(meth)acrylate, 2-methoxyethoxyethyl(meth)acrylate, 2-methoxyethyl methacrylate, polyethylene glycol mono(meth)acrylates; alkyl vinyl ethers, including vinyl methyl ether; and mixtures thereof. Preferred polar monomers include those selected from the group consisting of 2-hydroxyethyl(meth)acrylate and N-vinylpyrrolidinone. The polar monomer may be present in amounts of 0 to 10 parts by weight, preferably 0.5 to 10 parts by weight, based on 100 parts by weight total monomer.

The pressure-sensitive adhesive copolymer may further comprise other vinyl monomers. When used, vinyl monomers useful in the (meth)acrylate polymer include vinyl esters (e.g., vinyl acetate and vinyl propionate), styrene, substituted styrene (e.g., α-methyl styrene), vinyl halide, and mixtures thereof. As used herein vinyl monomers are exclusive of acid functional monomers, acrylate ester monomers and polar monomers. Such vinyl monomers are generally used at 0 to 5 parts by weight, preferably 1 to 5 parts by weight, based on 100 parts by weight total monomer.

There are two major crosslinking mechanisms for acrylic adhesives: free-radical copolymerization of multifunctional ethylenically unsaturated groups with the other monomers, and covalent or ionic crosslinking through the functional monomers, such as acrylic acid. Another method is the use of UV crosslinkers, such as copolymerizable benzophenones or post-added photocrosslinkers, such as multifunctional benzophenones and triazines. In the past, a variety of different materials have been used as crosslinking agents, e.g., polyfunctional acrylates, acetophenones, benzophenones, and triazines. Crosslinking may also be achieved using high energy electromagnetic radiation such as gamma or e-beam radiation. In this case, no additional crosslinker may be required.

In order to increase cohesive strength of the coated adhesive composition, a multifunctional (meth)acrylate may be incorporated into the blend of polymerizable monomers. Multifunctional acrylates are particularly useful for emulsion or syrup polymerization. Examples of useful multifunctional (meth)acrylate include, but are not limited to, di(meth)acrylates, tri(meth)acrylates, and tetra(meth)acrylates, such as 1,6-hexanediol di(meth)acrylate, poly(ethylene glycol)di(meth)acrylates, polybutadiene di(meth)acrylate, polyurethane di(meth)acrylates, and propoxylated glycerin tri(meth)acrylate, and mixtures thereof. The amount and identity of multifunctional (meth)acrylate is tailored depending upon application of the adhesive composition. Typically, the multifunctional (meth)acrylate is present in amounts less than 5 parts based on total dry weight of adhesive composition. More specifically, the crosslinker may be present in amounts from 0.01 to 5 parts, preferably 0.05 to 1 parts, based on 100 parts total monomers of the adhesive composition.

In some embodiments, the copolymer may comprise:
a) up to 100, preferably 51 to 99, more preferably 55 to 95 parts by weight of an (meth)acrylic acid ester monomer of 2-alkyl alkanols, with a molar carbon number average of 12 to 32;
b) 0 to 49, preferably 1 to 45, more preferably 5 to 45, parts by weight of an (meth)acrylic acid ester of a $C_1$-$C_{12}$ alkanol;
c) 0 to 15, preferably 0.1 to 10, most preferably 0.5 to 5, parts by weight of an acid functional ethylenically unsaturated monomer;

d) 0 to 10, preferably 0.5 to 10, parts by weight of a non-acid functional, ethylenically unsaturated polar monomer;

e) 0 to 5, preferably 1 to 5 parts by weight, of a vinyl monomer; and f) 0 to 5, preferably 0.01 to 5, most preferably 0.05 to 1 parts of a multifunctional (meth)acrylate;

based on 100 parts by weight total monomer.

The adhesive (co)polymers herein may be prepared by any conventional free radical polymerization method, including solution, radiation, bulk, dispersion, emulsion, and suspension processes. For optical applications, solution, UV and bulk processes are preferred. Other processes may introduce birefringence or foreign materials that may affect optic properties. The resulting adhesive (co)polymers may be random or block (co)polymers.

The adhesive copolymers may be prepared via suspension polymerizations as disclosed in U.S. Pat. No. 3,691,140 (Silver); U.S. Pat. No. 4,166,152 (Baker et al.); U.S. Pat. No. 4,636,432 (Shibano et al); U.S. Pat. No. 4,656,218 (Kinoshita); and U.S. Pat. No. 5,045,569 (Delgado).

Water-soluble and oil-soluble initiators useful in preparing the (meth)acrylate adhesive copolymers used in the present invention are initiators that, on exposure to heat, generate free-radicals which initiate (co)polymerization of the monomer mixture. Water-soluble initiators are preferred for preparing the (meth)acrylate polymers by emulsion polymerization. Suitable water-soluble initiators include but are not limited to those selected from the group consisting of potassium persulfate, ammonium persulfate, sodium persulfate, and mixtures thereof; oxidation-reduction initiators such as the reaction product of the above-mentioned persulfates and reducing agents such as those selected from the group consisting of sodium metabisulfite and sodium bisulfite; and 4,4'-azobis(4-cyanopentanoic acid) and its soluble salts (e.g., sodium, potassium). The preferred water-soluble initiator is potassium persulfate. Suitable oil-soluble initiators include but are not limited to those selected from the group consisting of azo compounds such as VAZO™ 64 (2,2'-azobis(isobutyronitrile)) and VAZO™ 52 (2,2'-azobis(2,4-dimethylpentanenitrile)), both available from E.I. du Pont de Nemours Co., peroxides such as benzoyl peroxide and lauroyl peroxide, and mixtures thereof. The preferred oil-soluble thermal initiator is (2,2'-azobis(isobutyronitrile)). When used, initiators may comprise from about 0.05 to about 1 part by weight, preferably about 0.1 to about 0.5 part by weight based on 100 parts by weight of monomer components in the pressure-sensitive adhesive.

Polymerization via emulsion techniques may require the presence of an emulsifier (which may also be called an emulsifying agent or a surfactant). Useful emulsifiers for the present invention include those selected from the group consisting of anionic surfactants, cationic surfactants, nonionic surfactants, and mixtures thereof.

Preferably, the emulsion polymerization is carried out in the presence of anionic surfactant(s). A useful range of surfactant concentration is from about 0.5 to about 8 weight percent, preferably from about 1 to about 5 weight percent, based on the total weight of all monomers of the emulsion pressure-sensitive adhesive.

Alternatively, the copolymers can be polymerized by techniques including, but not limited to, the conventional techniques of solvent polymerization, dispersion polymerization, and solventless bulk polymerization. The monomer mixture may comprise a polymerization initiator, especially a thermal initiator or a photoinitiator of a type and in an amount effective to polymerize the comonomers, as previously described.

The copolymerizable mixture may optionally further comprise chain transfer agents to control the molecular weight of the resultant polymer. Examples of useful chain transfer agents include but are not limited to those selected from the group consisting of carbon tetrabromide, alcohols, mercaptans, and mixtures thereof. When present, the preferred chain transfer agents are isooctylthioglycolate and carbon tetrabromide. The polymerizable mixture may further comprise up to about 0.5 parts by weight of a chain transfer agent, typically about 0.01 to about 0.5 parts by weight, if used, preferably about 0.05 parts by weight to about 0.2 parts by weight, based upon 100 parts by weight of the total monomer mixture.

A typical solution polymerization method is carried out by adding the monomers, a suitable solvent, and an optional chain transfer agent to a reaction vessel, adding a free radical initiator, purging with nitrogen, and maintaining the reaction vessel at an elevated temperature, typically in the range of about 40 to 100° C. until the reaction is completed, typically in about 1 to 20 hours, depending upon the batch size and temperature. Examples of the solvent are methanol, tetrahydrofuran, ethanol, isopropanol, acetone, methyl ethyl ketone, methyl acetate, ethyl acetate, toluene, xylene, and an ethylene glycol alkyl ether. Those solvents can be used alone or as mixtures thereof.

In a typical photopolymerization method, a monomer mixture may be irradiated with ultraviolet (UV) rays in the presence of a photopolymerization initiator (i.e., photoinitiators). Preferred photoinitiators are those available under the trade designations IRGACURE™ and DAROCUR™ from Ciba Speciality Chemical Corp., Tarrytown, N.Y. and include 1-hydroxy cyclohexyl phenyl ketone (IRGACURE™ 184), 2,2-dimethoxy-1,2-diphenylethan-1-one (IRGACURE 651), bis(2,4,6-trimethylbenzoyl)phenylphosphineoxide (IRGACURE™ 819), 1-[4-(2-hydroxyethoxy)phenyl]-2-hydroxy-2-methyl-1-propane-1-one (IRGACURE™ 2959), 2-benzyl-2-dimethylamino-1-(4-morpholinophenyl)butanone (IRGACURE™ 369), 2-methyl-1-[4-(methylthio)phenyl]-2-morpholinopropan-1-one (IRGACURE™ 907), and 2-hydroxy-2-methyl-1-phenyl propan-1-one (DAROCUR™ 1173). Particularly preferred photoinitiators are IRGACURE™ 819, 651, 184 and 2959.

Solventless polymerization methods, such as the continuous free radical polymerization method described in U.S. Pat. Nos. 4,619,979 and 4,843,134(Kotnour et al.); the essentially adiabatic polymerization methods using a batch reactor described in U.S. Pat. No. 5,637,646 (Ellis); and, the methods described for polymerizing packaged pre-adhesive compositions described in U.S. Pat. No. 5,804,610 (Hamer et al.) may also be utilized to prepare the polymers.

The pressure-sensitive adhesives may also contain one or more conventional additives. Preferred additives include tackifiers, plasticizers, dyes, antioxidants, and UV stabilizers. Such additives can be used if they do not affect the superior properties of the emulsion pressure-sensitive adhesives.

Conventional acrylic adhesives do not adhere well to certain substrates, such as certain types of automotive paints and low energy olefinic surfaces. Efforts have been made to improve the adhesion of acrylic adhesives, i.e., develop more aggressive tack, to these types of surfaces; tackifying the base acrylic polymer is commonly practiced. Various types of tackifiers include phenol modified terpenes, hydrocarbon resins such as polyvinyl cyclohexane and poly(t-butyl styrene), and rosin esters such as glycerol esters of rosin and pentaerythritol esters of rosin.

Various types of tackifiers include phenol modified terpenes and rosin esters such as glycerol esters of rosin and pentaerythritol esters of rosin that are available under the trade names Nuroz™, Nutac™ (Newport Industries), Permalyn™, Staybelite™, Foral™ (Eastman). Also available are hydrocarbon resin tackifiers that typically come from C5 and C9 monomers by products of naphtha cracking and are available under the trade names Piccotac™, Eastotac™, Regalrez™, Regalite$^{SM}$ (Eastman), Arkon™ (Arakawa), Norsolene™, Wintack™ (Cray Valley), Nevtack, LX (Neville Chemical Co.), Hikotack™, Hikorez™ (Kolon Chemical), Novares™ (Rutgers Nev.), Quintone™ (Zeon), Escorez™ (Exxonmobile Chemical), Nures™, and H-Rez™ (Newport Industries).

Due to the high solubility parameter of most conventional pressure-sensitive acrylic adhesives and the presence of specific potential interactions between these adhesives and many tackifiers, a limited selection of tackifiers is available to the formulator. As a class, hydrocarbon-based tackifiers, and especially hydrogenated hydrocarbon resins, are typically unsuitable for use in polar acrylic adhesives formulations due to their nonpolar character.

Rosin acid based tackifiers and selected phenol-modified terpene and alpha-pinene based resins perform well in a variety of conventional acrylic pressure-sensitive adhesives. However, some problems are still associated with the use of this limited range of tackifiers in such acrylic adhesives. Tackified acrylic pressure-sensitive adhesive formulations are often discolored or yellow. The yellow appearance of these tackified acrylic pressure-sensitive adhesives is a direct result of the distinct yellow tinge inherent in many of these tackifiers. Upon aging and exposure to light, this discoloration can become even more pronounced, even with lighter colored grades of resin. Acrylic adhesives without tackifiers typically have excellent aging properties.

Conventional tackified acrylic pressure-sensitive adhesives can also appear cloudy, demonstrating a loss in the characteristic transparency found in many conventional acrylate pressure-sensitive adhesive compositions. The cloudiness is an indication of limited or incomplete compatibility of the tackifier and the acrylic polymers. The reduced compatibility can lead to a degradation of adhesive properties on aging, as evidenced by a loss of tack or reduced peel adhesion. In some cases, the addition of a tackifier to an adhesive composition having acrylic monomers, polymers, oligomers, and any mixture thereof, can be clear and appear to be compatible. However, after removing the solvent, curing the adhesive, or on aging, the adhesive can become cloudy, indicating some incompatibility between the tackifier and acrylic base polymer.

In addition to these losses in clarity and stability of tackified acrylic adhesives, other deleterious effects can be observed when tackifiers are present during bulk acrylic polymerization reactions. Depending on the structure of the tackifier, undesirable effects of adding a tackifier include the inhibition or retardation of the polymerization reaction and/or the alteration of the final polymer structure if the tackifier acts as a chain-transfer or chain-terminating agent. Such effects can adversely influence the performance and stability of acrylates polymerized in the presence of these tackifiers. Chain termination can also result in undesirably high residual volatile materials.

In many embodiments, the present disclosure provides tackified PSA compositions that overcome problems noted in the art. The tackifier is preferably selected from a material that is essentially free of any ethylenically or acetylenically unsaturated bonds. The tackifier includes, but is not limited to, hydrogenated rosin resins, hydrogenated and esterified rosin resins, hydrogenated terpene resins, aliphatic petroleum resins, aromatic petroleum resins, alicyclic petroleum resins obtained by hydrogenating aromatic petroleum resins, and the like. Preferably, the tackifier used is selected from hydrogenated $C_9$ petroleum resins such as but not limited to Regalrez™ tackifiers (Eastman) or Arkon™ (Arakawa) tackifiers. Such "hydrophobic tackifiers", may be used in amounts of 20 to 150 parts, preferably 50 to 100 parts, of said tackifier, relative to 100 parts of said (meth)acrylate ester (co)polymer The adhesives of the present invention may be coated upon a variety of flexible and inflexible backing materials using conventional coating techniques to produce adhesive-coated materials. Flexible substrates are defined herein as any material which is conventionally utilized as a tape backing or may be of any other flexible material. Examples include, but are not limited to plastic films such as polypropylene, polyethylene, polyvinyl chloride, polyester (polyethylene terephthalate), polycarbonate, polymethyl(meth)acrylate (PMMA), cellulose acetate, cellulose triacetate, and ethyl cellulose. Foam backings may be used. Examples of inflexible substrates include, but are not limited to, metal, metallized polymeric film, indium tin oxide coated glass and polyester, PMMA plate, polycarbonate plate, glass, or ceramic sheet material. The adhesive-coated sheet materials may take the form of any article conventionally known to be utilized with adhesive compositions such as labels, tapes, signs, covers, marking indices, display components, touch panels, and the like. Flexible backing materials having microreplicated surfaces are also contemplated.

The above-described compositions are coated on a substrate using conventional coating techniques modified as appropriate to the particular substrate. For example, these compositions can be applied to a variety of solid substrates by methods such as roller coating, flow coating, dip coating, spin coating, spray coating knife coating, and die coating. These various methods of coating allow the compositions to be placed on the substrate at variable thicknesses thus allowing a wider range of use of the compositions. Coating thicknesses may vary, but coating thicknesses of 2-500 microns (dry thickness), preferably about 25 to 250 microns, are contemplated.

The adhesives of the present disclosure are particularly useful for forming strong bonds to low surface energy (LSE) substrates. As used herein, low surface energy substrates are those having a surface energy of less than about 45 dynes per centimeter, more typically less than about 40 dynes per centimeter, and most typically less than about 35 dynes per centimeter. Included among such materials are polypropylene, polyethylene (e.g., high density polyethylene or HDPE), polystyrene and poly(methyl methacrylate) (PMMA). Other substrates may also have properties of low surface energy due to a residue, such as an oil residue or a film such as a paint, being on the surface of the substrate. However, even though the present adhesive bonds well to low surface energy surfaces, the invention is not limited to being bonded to low surface energy substrates, as it has been found that the inventive adhesive can also bond well to higher surface energy substrates such as, for example, other plastics, ceramics (e.g., glass), metals.

The substrate is selected depending on the particular application in which it is to be used. For example, the adhesive can be applied to sheeting products, (e.g., decorative graphics and reflective products), label stock, and tape backings Additionally, the adhesive may be applied directly onto a substrate such as an automotive panel, or a glass window so that another substrate or object can be attached to the panel or window.

The adhesive can also be provided in the form of a pressure-sensitive adhesive transfer tape in which at least one layer of the adhesive is disposed on a release liner for application to a permanent substrate at a later time. The adhesive can also be provided as a single coated or double coated tape in which the adhesive is disposed on a permanent backing. Backings can be made from plastics (e.g., polypropylene, including biaxially oriented polypropylene, vinyl, polyethylene, polyester such as polyethylene terephthalate), nonwovens (e.g., papers, cloths, nonwoven scrims), metal foils, foams (e.g., polyacrylic, polyethylene, polyurethane, neoprene), and the like. Foams are commercially available from various suppliers such as 3M Co., Voltek, Sekisui, and others. The foam may be formed as a coextruded sheet with the adhesive on one or both sides of the foam, or the adhesive may be laminated to it. When the adhesive is laminated to a foam, it may be desirable to treat the surface to improve the adhesion of the adhesive to the foam or to any of the other types of backings Such treatments are typically selected based on the nature of the materials of the adhesive and of the foam or backing and include primers and surface modifications (e.g., corona treatment, surface abrasion). Additional tape constructions include those described in U.S. Pat. No. 5,602,221 (Bennett et al.), incorporated herein by reference.

For a single-sided tape, the side of the backing surface opposite that where the adhesive is disposed is typically coated with a suitable release material. Release materials are known and include materials such as, for example, silicone, polyethylene, polycarbamate, polyacrylics, and the like. For double coated tapes, another layer of adhesive is disposed on the backing surface opposite that where the adhesive of the invention is disposed. The other layer of adhesive can be different from the adhesive of the invention, e.g., a conventional acrylic PSA, or it can be the same adhesive as the invention, with the same or a different formulation. Double coated tapes are typically carried on a release liner.

EXPERIMENTAL

The following monomers were obtained and used without further purification. Monomers CM 7 and Guerbet Monomers (GM 1-11) were synthesized according to the following Preparatory Examples.

TABLE 1

Monomers

| Monomer designation | Description |
|---|---|
| CM 1 | Isooctyl acrylate (IOA, 3M) |
| CM 2 | 2-ethylhexyl acrylate (EHA, Aldrich) |
| CM 3 | Isodecyl acrylate (IDA, Aldrich) |
| CM 4 | 2-propylheptyl acrylate (PHA, BASF) |
| CM 5 | lauryl acrylate (LA, Sartomer) |
| CM 6 | lauryl methacrylate (LMA, Sartomer) |
| CM 7 | Acrylate of Exxal 13, a tridecyl alkanol (Exxon) |
| GM 1 | 2-butyl-1-octyl acrylate |
| GM 2 | Mixture of: |
|  | 2-butyl-1-octyl acrylate |
|  | 2-butyl-1-decyl acrylate |
|  | 2-hexyl-1-octyl acrylate |
|  | 2-hexyl-1-decyl acrylate |
| GM 3 | 2-hexyl-1-decyl acrylate |
| GM 4 | Mixture of: |
|  | 2-hexyl-1-decyl acrylate |
|  | 2-octyl-1-decyl acrylate |
|  | 2-hexyl-1-dodecyl acrylate |
|  | 2-octyl-1-dodecyl acrylate |
| GM 5 | 2-octyl-1-dodecyl acrylate |
| GM 6 | 2-decyl-1-tetradecyl acrylate |
| GM 7 | 2-dodecyl-1-hexadecyl acrylate |
| GM 8 | 2-tetradecyl-1-octadecyl acrylate |
| GM 9 | Acrylate of Fineoxocol FO180, a $C_{18}$ alkanol (Nissan) |
| GM 10 | Acrylate of Fineoxocol FO180N, a $C_{18}$ alkanol (Nissan) |
| GM 11 | 2-octyl-1-dodecyl methacrylate |

Test Methods

Test Method 1: Dynamic Scanning Calorimetric Analysis of Monomers and Homopolymer Films Approximately 10 mg of each of CM 1-7 and GM 1-11 were placed in individual standard aluminum DSC pans (TA Instruments T080715) and placed in the autosampler of a dynamic scanning calorimeter (DSC, TA Instruments). For each sample, pans were individually placed on one of the differential posts in the DSC's enclosed cell along with an empty reference pan on the opposite post. Temperature was raised to 55° C. and held for 10 minutes to thermally anneal the sample which was then cycled between −95° C. and 55° C. twice at 3° C./min. Transitions such as the crystallinity, temperature (TO, melting temperature ($T_m$), and glass transition temperature ($T_g$) were identified in the scanning profile of heat flow vs. temperature. Typically, crystallization and melting transitions show up as positive and negative heat flow peaks as the sample is cooled and heated, and the latent heat is given off or absorbed, respectively. Conversely a glass transition is generally represented by a shift in the profile slope upon heating as the heat capacity of the sample after the transition is altered. The glass transition temperature was recorded at the inflection point of the curve associated with this shift in heat flow profile.

DSC analysis described above was repeated for homopolymers of each of the monomers. To generate homopolymer samples of the acrylic monomers listed in the preparatory examples above, 5 g of acrylic monomers CM 1-5,and 7, and GM 1-10 from Table 1 were each mixed with 0.05 wt % Irgacure™ 651 (Ciba) for 1 hour in an amber vial with magnetic stirring. Samples were cured in a clamped mold using a 2 mm thick silicone spacer cavity between release liners and glass plates. The mold was placed in a vertical position so that only one edge of the mold was in contact with air and then cured for 10 minutes on each glass face side with UV irradiation (365 nm, ~5 mW/cm$^2$). Post cure, the glass plates and silicone spacers were removed to leave the homopolymer film between release liners.

To generate homopolymer samples of the methacrylate monomers, 50 g of monomers CM 6 and GM 11 were each mixed with 50 g of toluene and 0.2 g of thermal initiator 2,2'-azobis(2-methyl-butanenitrile) (Vazo™ 67, DuPont), and 0.01 g of isooctyl thiolglycolate (IOTG, Aldrich) for 10 minutes in an amber bottle with magnetic stirring. Nitrogen was bubbled through this solution for 30 minutes, the bottle was sealed, and placed in a laundrometer for 24 hours at 70° C. Post polymerization, material was drained from the bottle into aluminum tins and placed in an oven at 70° C., followed by 24 hours under vacuum to remove all solvent.

Test Method 2: Dynamic Mechanical Analysis of Homopolymer Films

Dynamic mechanical analysis (DMA) of each of the homopolymers generated for Test Method 1 was accomplished using an AR2000 parallel plate rheometer (TA Instruments) to characterize the physical properties of each sample as a function of temperature. For each sample, approximately 0.5 g of homopolymer material was centered between 8 mm diameter parallel plates of the rheometer and compressed until the edges of the sample were uniform with the edges of the top and bottom plates. The furnace doors that surround the parallel plates and shafts of the rheometer were shut and the temperature was raised to 140° C. and held for 5 minutes. The temperature was then ramped from 140° C. to −80° C. at 3° C./min while the parallel plates were oscillated at a frequency of 1 Hz and a constant % strain of 0.4%. While many physical parameters of the material are recorded during the temperature ramp, storage modulus (G'), loss modulus (G"), and tan delta are of primary importance in the characterization of the homopolymers of this invention.

The glass transition temperature, $T_g$, of the adhesive composition can be measured by first determining its storage (G') and loss shear moduli (G"). The ratio of G"/G', a unit less parameter typically denoted "tan delta", is plotted versus temperature. The maximum point (point where the slope is zero) in the transition region between the glassy region and the rubbery region of the tan delta curve, if well defined, determines the Tg of the adhesive composition at that particular frequency.

For each of the homopolymer films generated, storage modulus was recorded at room temperature (25° C.), $T_g$ was recorded at the peak of the tan delta curve, and the width of the tan delta peak was quantified by taking the peak width at a fixed height of approximately half of the peak intensity (FHPW).

Test Method 3: Aging of Adhesive Formulated Films

Cured adhesive films were aged under two conditions. A sample adhesive film of each formulation was stored at constant temperature (25° C.) and constant relative humidity (50%) for 48 hours after which visual characterization, as well as peel and shear adhesive tests were conducted. A second sample of each formulation was placed in aluminum bins in an oven at 70° C. for one week before visual characterization, peel, and shear testing.

Test Method 4: Visual Analysis of Adhesive Formulated Films

Cured adhesive films were characterized for clarity by visually classifying the adhesive film as clear, translucent (trans) or opaque.

Test Method 5: 180° Peel Adhesion Strength Test

Peel adhesion is the force required to remove a coated flexible sheet material from a test panel measured at a specific angle and rate of removal. In the examples of this invention, the peel force is expressed in Newtons per width of coated sheet (Newtons/dm). For each test, a 12.7 mm width of the adhesive coated sheet material approximately 15 cm long was cut and the release layer peeled away from the coated adhesive. The adhesive strip was then applied to the clean face of a stainless steel test panel. A heavy rubber roller was used to apply the strip. The free end of the coated strip was doubled back so that the angel of removal was 180 degrees. The free end was attached to the horizontal arm of the adhesion tester scale. The stainless steel plate was then affixed to the platform of the instrument which is mechanized to move at a controlled rate (30.5 cm/min) away from the scale. The peel test was started soon after the adhesive was applied to the substrate without allowing for an induction time for adhesion to build. The scale reading in ounces was read during the test as an average of both the peak and minimum forces during the peel. Three peel tests were run for each sample and averaged to yield the peel adhesion value.

Peel adhesion was also measured for each sample using the above procedure on test panels of high density polyethylene (HDPE, International Plastics—Edina, Minn.).

Test Method 6: High Temperature Shear Strength

Shear strength is measured in terms of the time required to pull a defined area of adhesive coated backing material from a stainless steel test panel under the stress of a constant or static load parallel to the test panel.

Shear tests were conducted using adhesive coated PET material with approximately a 0.08 mm thick adhesive coating. Cut adhesive strips were applied to a clean stainless steel panel such that a 12.7 mm by 25.4 mm portion of each strip was in firm contact with the panel and one end portion of each strip was free. The panel with adhesive strip was held in a rack such that the panel forms a 180 degree angle with the extended free end which is then tensioned by applying a 500 gram hanging weight. The rack was enclosed in a 70° C. oven and the time elapsed for each tape example to separate from the test panel is recorded as the shear strength in minutes. Two shear tests were performed for each sample adhesive and the shear strength averaged.

Test Method 7: 90° Angle Peel Adhesion Strength Test.

Evaluation of peel adhesion strength at an angle of 90° was performed as described in the ASTM International standard, D3330, Method F, with a 1.3 cm×20 cm (½ in.×8 in.) test specimen using an IMASS SP-200 slip/peel tester (available from IMASS, Inc., Accord, Mass.) at a peel rate of 305 mm/minute (12 inches/minute). The samples were adhered to the test panels by rolling down the tapes with a 2.0 kg (4.5 lb.) rubber roller using 4 passes. The peel tests were performed after a 24 hour dwell time in a controlled environment room on the test panel, unless otherwise stated. The average peel adhesion force required to remove the tape from the panel was measured in ounces and is expressed in Newtons/decimeter (N/dm), based on 3 samples.

Preparative Examples (CM7) and Guerbet Monomers (GM 1-10)

Method 1

A mixture of the alkanol, acrylic acid (AA, TCI), p-toluene sulfonic acid hydrate (TSA, J.T. Baker), phenothiazine (PT, Aldrich), and toluene were heated to reflux. The liberated water was collected in a Dean and Stark trap. After the reaction was complete (4-6 hours), the reaction was cooled, then washed with 1.0 M NaOH, and water. The solvent was removed under vacuum. The crude oil was then distilled under vacuum to give the product as a colorless oil.

TABLE 2

|  | Alkanol | Alkanol, g | AA, g | TSA, g | PT, g | Toluene, mL | Yield, g |
|---|---|---|---|---|---|---|---|
| CM 7 | Exxal 13 (Exxon) | 150.00 | 65.46 | 1.00 | 0.50 | 280 | 171.35 |
| GM 1 | Isofol 12 (Sasol) | 300.00 | 139.05 | 2.20 | 1.00 | 465 | 334.71 |
| GM 9* | Fineoxocol FO-180 (Nissan) | 29.99 | 8.77 | 0.35 | 0.09 | 100 | 4.77 |

*GM9 product was not distilled.

Method 2

A mixture of alkanol, triethylamine (TEA, Alfa Aesar), and methylene chloride (MC) was cooled to 5° C. using an ice bath. Acryloyl chloride (AC, Alfa Aesar) was added dropwise over one hour with mechanical stirring. After 10 hours, the mixture was filtered, then concentrated under vacuum. The remaining oil was diluted with ethyl acetate and washed with 1.0 M HCl, 1.0 M NaOH, and brine. The organic layer was then concentrated under vacuum. The crude oil was mixed with an equal potion of hexane and passed through a column of neutral alumina to remove colored impurities. The alumina was eluted with hexane. The collected filtrate was concentrated under vacuum to give the final product as a colorless oil.

TABLE 3

|  | Alkanol | Alkanol, g | TEA, g | MC, g | AC, g | Yield, g |
|---|---|---|---|---|---|---|
| GM 2 | Isofol 14T (Sasol) | 75.00 | 38.45 | 350 | 34.39 | 48.98 |
| GM 3 | 2-hexyl-1-decanol (Aldrich) | 100.00 | 45.97 | 350 | 41.10 | 102.07 |
| GM 4 | Isofol 18T (Sasol) | 197.17 | 78.12 | 700 | 69.86 | 195.05 |
| GM 5 | Isofol 20 (Sasol) | 80.00 | 29.08 | 275 | 25.75 | 84.31 |
| GM 6 | Isofol 24 (Sasol) | 100.00 | 28.53 | 300 | 28.10 | 86.60 |
| GM 7 | Isofol 28 (Sasol) | 60.50 | 16.29 | 250 | 14.57 | 60.00 |
| GM 8 | Isofol 32 (Sasol) | 150.00 | 35.61 | 550 | 31.85 | 147.61 |
| GM 10 | Fineoxocol FO180N (Nissan) | 35.00 | 15.59 | 150 | 14.07 | 29.71 |

Guerbet Monomer 11 (GM 11)

A flask was charged with Isofol™ 20 (100.00 g, 0.33 mol), methacrylic anhydride (Monomer and Polymer Dajac Lab, Trevose, Pa., 59.46 g, 0.38 mol), 4-dimethylamino pyridine (Aldrich, 1.00 g), and ethyl acetate (100 mL). The mixture was stirred at 60° C. for 17 hours, then for an additional 7 hours at 90° C. The mixture was diluted with ethyl acetate (200 mL), then washed with 1.0 M HCl, and 1.0 M NaOH. The organic layer was then concentrated under vacuum. The crude oil was mixed with an equal potion of hexane and passed through a column of neutral alumina to remove colored impurities. The alumina was eluted with hexane. The collected fractions were concentrated under vacuum to give the final product as a colorless oil (109.17 g).

DSC analysis for monomers CM 1-7 and GM 1-11 were completed following the procedures outlined in Test Method 1. The results are listed below in Table 4. In Table 4 "NO" means not observed.

TABLE 4

Thermal Transitions of (meth)acrylic monomers measured by DSC

| Monomer | Molar Carbon Number Average | $T_c$ (° C.) | $T_m$ (° C.) |
|---|---|---|---|
| CM 1 (IOA) | 8 | NO | NO |
| CM 2 (EHA) | 8 | NO | NO |
| CM 3 (IDA) | 10 | NO | NO |
| CM 4 (PHA) | 10 | NO | NO |
| CM 5 (LA) | 12 | −23.8 | 0.3 |
| CM 6 (LMA) | 12 | −24 | 4 |
| CM 7 | 13 | NO | NO |
| GM 1 | 12 | NO | NO |
| GM 2 | 14 | NO | NO |
| GM 3 | 16 | NO | NO |
| GM 4 | 18 | −82.1 | −61.2 |
| GM 9 | 18 | NO | NO |
| GM 10 | 18 | NO | NO |
| GM 5 | 20 | −59.2 | −41.2 |
| GM 11 | 20 | −65.2 | −48.1 |
| GM 6 | 24 | −30.4 | −9.8 |
| GM 7 | 28 | −8.0 | 7.5 |
| GM 8 | 32 | 4.3 | 21.4 |

As shown in Table 4, monomers with common linear, substituted (meth)acrylic monomers (CM 1-7) start to exhibit crystalline behavior with alkyl chains of $C_{12}$ or greater. The exception to this is CM 7 which is a highly substituted $C_{13}$ acrylate. In comparison, the Guerbet alkanol (meth)acrylates (GM 1-11) do not show evidence of crystallinity until $C_{18}$ alkyl chains are present in the monomer. Additional substitution of methyl groups on the $C_{18}$ alkyl chain (GM 9 and 10) serve to depress crystallization of the comparable $C_{18}$ (GM 4) down below the instruments limit of −100° C. It is noted that GM 8 with a $C_{32}$ alkyl chain is in a liquid state at room temperature.

DSC and DMA analysis of homopolymer films of Examples 1-11, Comparative Examples C1-C7

DSC and DMA analysis for CM 1-7 and GM 1-11 were completed following the procedures outlined in Test Methods 1 and 2. The results are listed below in Table 5. In Table 5 "NO" means not observed and "NT" means not tested.

TABLE 5

Thermal Transitions and mechanical properties of (meth)acrylic homopolymers.

| Example | Monomer | Molar Carbon Number Average | DSC Analysis | | | DMA Analysis | | |
|---|---|---|---|---|---|---|---|---|
| | | | Tc (° C.) | Tm (° C.) | Tg (° C.) | Tg (° C.) | St. Mod @ 25 C. (MPa) | FWPH (C.) |
| Comparative 1 | CM 1 | 8 | NO | NO | −65.4 | −38.1 | 19,500 | 26.7 |
| Comparative 2 | CM 2 | 8 | NO | NO | −63.4 | −46.2 | 18,800 | 33.5 |
| Comparative 3 | CM 3 | 10 | NO | NO | −62.5 | −38.4 | 8,700 | 36.7 |
| Comparative 4 | CM 4 | 10 | NO | NO | −69.1 | −45.7 | 10,000 | 39 |
| Comparative 5 | CM 5 | 12 | −7.9 | 3.9 | NO | NO | 4,475 | NO |
| Comparative 6 | CM 6 | 12 | −42.5 | −34.5 | NO | −10.5 | 10,980 | 97 |
| Comparative 7 | CM 7 | 13 | NO | NO | −58.6 | −31.2 | 13,300 | 43.5 |
| 1 | GM 1 | 12 | NO | NO | −75.8 | −47.2 | 7,200 | 46.4 |
| 2 | GM 2 | 14 | NO | NO | −79.1 | −52.5 | 7,780 | 48.6 |

TABLE 5-continued

Thermal Transitions and mechanical properties of (meth)acrylic homopolymers.

| Example | Monomer | Molar Carbon Number Average | DSC Analysis Tc (° C.) | DSC Analysis Tm (° C.) | DSC Analysis Tg (° C.) | DMA Analysis Tg (° C.) | St. Mod @ 25 C. (MPa) | FWPH (C.) |
|---|---|---|---|---|---|---|---|---|
| 3 | GM 3 | 16 | NO | NO | −74.8 | −47.8 | 7,200 | 51.7 |
| 4 | GM 4 | 18 | NO | NO | −75 | −49.2 | 3,110 | 55.3 |
| 5 | GM 9 | 18 | NO | NO | −12.2 | NT | NT | NT |
| 6 | GM 10 | 18 | NO | NO | −59 | −20.9 | 15,500 | 67.4 |
| 7 | GM 5 | 20 | NO | NO | −69.8 | −44.9 | 6,200 | 52.3 |
| 8 | GM 11 | 20 | NO | NO | −48.0 | −13.2 | 28,000 | 53.1 |
| 9 | GM 6 | 24 | −47 | −36.9 | NO | NO | 4,320 | NO |
| 10 | GM 7 | 28 | −16.3 | −6.4 | NO | NT | NT | NT |
| 11 | GM 8 | 32 | 8.2 | 13.6 | NO | NO | 1,930 | NO |

As shown in Table 5 above, polymers generated from monomers with common linear, substituted (meth)acrylic monomers (CM 1-7) start to exhibit crystalline domains at molar carbon number average of 12 or greater. The exception to this is CM 7 which is a highly methyl substituted $C_{13}$ acrylate. In comparison, polymers generated using the synthesized (meth)acrylates of this invention (GM 1-11) do not show evidence of crystallinity below molar carbon number average of 24.

In general, the branched, linear chain structure of the monomers synthesized in this invention (GM 1-8) leads to significantly lower $T_g$ as measured by DSC and DMA compared to homopolymers of common PSA acrylates of linear, methyl substituted chain structure (CM 1,3,5,7). Methyl substitution on the $C_{18}$ branched structure (GM 10) significantly increases its $T_g$ over the comparable non-methyl substituted $C_{18}$ (GM 4).

Examples 12-28, Comparative Examples C8-C19
Peel Adhesive Properties of Adhesive Formulated Films An improvement in adhesive performance using Guerbet monomers was demonstrated by carrying out peel tests of tackified and crosslinked adhesive films on multiple substrates following the procedure outlined in Test Method 5.

The failure (F) of each PSA sample is classified as adhesive failure (af), cohesive split (cs), partial cohesive split (pcs), partial transfer (pt), or ghosting (g). Samples of this series that were not tested are identified with NT.

Monomers CM 1-3, 7 and GM 1-4, 10 were each mixed using the following example formula. 28.5 g of GM 1, 0.02 g of Irgacure™ 651 (Ciba), 0.3 g of acrylic acid (AA, Alfa Aesar), and 1.2 g of hydroxyethyl acrylate (HEA, Aldrich) were mixed using a magnetic stir bar in a clear glass vial. The glass vial was then purged with nitrogen for 5 minutes to remove dissolved oxygen and then placed in front of a UV light (365 nm, ~5 mW/cm$^2$) until a coatable viscosity was achieved. A typical target for this step is an approximate viscosity of 3000 cP at room temperature and acrylic conversion of approximately 10-20%.

Each "thickened" sample was then formulated with low polarity tackifier Regalrez 1094 (Eastman Co.) at 50, 75, 85, or 100 pph (parts per hundred relative to the resin), additional Irgacure™ 651, as well as photocrosslinker, XL-330 (2,4,-bis (trichloromethyl)-6-(4-methoxyphenyl)-triazine, 3M). As an example formulation, 5 g of "thickened" monomer formulation based on GM1 was added to an amber vial along with 2.5g of Regalrez™ 1094 tackifier (50 pph), 0.0045 g (0.09 pph) of Irgacure 651™ and 0.004 g (0.08 pph) of XL-330. The amber vial was then rotated in the dark until the solid ingredients were completely dissolved. The adhesive formulation described above was coated onto primed PET film at a coating thickness of 0.08 mm and covered with a silicone treated release liner. This construction was then cured using approximately 600 mJ/cm$^2$ of UV irradiation. This procedure was repeated for each additional adhesive formulation.

The results are shown in Table 6. In Table 6 "Trans" means visually translucent, "NT" means not tested and "Carbon Number" means molar carbon number average.

TABLE 6

180° Peel Performance for Tackified Adhesive Films on Stainless Steel and HDPE

| Example | Monomer | Carbon Number | R-1094 Tackifier loading (pph) | 180° Peel Performance Immediately after cure Visual | S. Steel (N/dm) | F | HDPE (N/dm) | F | Aging 70° C. for 1 week Visual | HDPE (N/dm) | F |
|---|---|---|---|---|---|---|---|---|---|---|---|
| C8 | CM1 | 8 | 50 | Opaque | 20 | af | 17 | af | Opaque | 13 | af |
| C9 | CM1 | 8 | 75 | Opaque | 4 | af | 4 | af | Opaque | 4 | af |
| C10 | CM1 | 8 | 85 | Opaque | 9 | 2b | 2 | af | Opaque | 3 | af |
| C11 | CM2 | 8 | 50 | Opaque | 22 | af | 23 | af | Opaque | 14 | g |
| C12 | CM2 | 8 | 75 | Opaque | 4 | g | 4 | af | Opaque | 4 | af |
| C13 | CM2 | 8 | 85 | Opaque | 14 | 2b | 1 | af | Opaque | 3 | g |
| C14 | CM3 | 10 | 50 | Opaque | 55 | af | 39 | af | Opaque | NT | NT |
| C15 | CM3 | 10 | 75 | Opaque | 35 | af | 38 | af | Opaque | NT | NT |

TABLE 6-continued

180° Peel Performance for Tackified Adhesive Films on Stainless Steel and HDPE

| | | | R-1094 | 180° Peel Performance | | | | | | |
|---|---|---|---|---|---|---|---|---|---|---|
| | | | Tackifier | Immediately after cure | | | | Aging 70° C. for 1 week | | |
| Example | Monomer | Carbon Number | loading (pph) | Visual | S. Steel (N/dm) | F | HDPE (N/dm) | F | Visual | HDPE (N/dm) | F |
| C16 | CM3 | 10 | 85 | Opaque | 14 | af | 25 | af | Opaque | NT | NT |
| C17 | CM7 | 13 | 50 | Clear | 61 | af | 48 | af | Clear | NT | NT |
| C18 | CM7 | 13 | 75 | Clear | 79 | g | 23 | af | Clear | NT | NT |
| C19 | CM7 | 13 | 85 | Clear | 22 | af | 3 | af | Trans | NT | NT |
| 12 | GM1 | 12 | 50 | Clear | 48 | af | 38 | af | Trans | 50 | af |
| 13 | GM1 | 12 | 75 | Trans | 69 | af | 64 | af | Opaque | 26 | af |
| 14 | GM1 | 12 | 85 | Trans | 92 | pcs | 67 | pcs | Opaque | 7 | af |
| 15 | GM2 | 14 | 50 | Clear | 49 | pcs | 37 | af | Clear | 44 | af |
| 16 | GM2 | 14 | 75 | Clear | 85 | cs | 61 | pt | Clear | 66 | af |
| 17 | GM2 | 14 | 85 | Clear | 88 | cs | 61 | pt | Clear | 66 | af |
| 18 | GM2 | 14 | 100 | Clear | 89 | cs | 46 | g | Clear | 63 | af |
| 19 | GM3 | 16 | 50 | Clear | 43 | af | 33 | af | Clear | 37 | af |
| 20 | GM3 | 16 | 75 | Clear | 77 | af | 49 | af | Clear | 62 | af |
| 21 | GM3 | 16 | 85 | Clear | 85 | pcs | 60 | g | Clear | 68 | af |
| 22 | GM3 | 16 | 100 | Clear | 85 | pcs | 61 | g | Clear | 69 | af |
| 23 | GM4 | 18 | 50 | Clear | 42 | af | 34 | af | Clear | 37 | af |
| 24 | GM4 | 18 | 75 | Clear | 94 | pcs | 79 | pcs | Clear | 77 | af |
| 25 | GM4 | 18 | 85 | Clear | 101 | cs | 76 | pcs | Clear | 69 | af |
| 26 | GM4 | 18 | 100 | Clear | 88 | cs | 71 | pcs | Clear | 76 | af |
| 27 | GM10 | 18 | 50 | Clear | 92 | pcs | 58 | af | Clear | NT | NT |
| 28 | GM10 | 18 | 85 | Clear | 32 | cs | 33 | cs | Clear | NT | NT |

The data of Table 6 indicates poor solubility of the low polarity tackifier (R-1094) with typical $C_8$ PSA acrylates. Tackifier solubility improves as the molar carbon number is increased above 12. With respect to aging, samples with molar carbon mnumbers below 14 show opacity of the adhesive upon aging suggesting a phase separation and incompatibility of the polymer with the tackifier. Contrarily, examples 15-28 remain clear upon aging, even with extremely high loadings of tackifier (100 pph).

The data of Table 6 indicates that greater peel performance is achieved with PSAs containing monomers with molar carbon numbers greater than 12, particularly with GM 1-4, and GM 10. Comparative examples CM 1 and CM 2 (IOA and 2EHA respectively) perform poorly in regards to peel adhesive strength most likely due to the poor solubility of this tackifier in these adhesive formulations as demonstrated in Table 6.

In comparison to PSAs generated with comparative example monomers, adhesive films using the Guerbet monomers of this invention show exceptional peel performance on both stainless steel and HDPE, particularly at high loadings of tackifier.

Shear Performance of Adhesive Formulated Films of Examples 10-23 and Comparative Examples C8-C19

Adhesives generated in Comparative Examples C8-C19 and Examples 12-14, 19-21, and 23-25 were all tested for shear holding performance following the procedure outlined in Test Method 3. Each sample tested held for over 10,000 minutes at 70° C. at which time the test was discontinued. These results demonstrate that PSA materials generated from the Guerbet monomers of this invention still exhibit a similar high degree of shear holding performance when compared to PSAs based on traditional $C_8$ acrylate monomers.

Blend (B) Preparatory Examples of Base Monomers

Guerbet acrylates based on GM 4, 6 and 8 were blended with 2-ethylhexyl acrylate (CM 2) following the amounts specified in Table 7 to yield compositions of acrylates with targeted molar carbon number averages of 12-18.

TABLE 7

Blends of Guerbet Acrylates with 2-Ethylhexyl acrylate (CM 2)

| Preparatory Blend Example | CM 2 (g) $C_8$ | GM 4 (g) $C_{18}$ | GM 6 (g) $C_{24}$ | GM 8 (g) $C_{32}$ | Molar Carbon Number Average |
|---|---|---|---|---|---|
| B1 | 45 | 55 | | | 12 |
| B2 | 27 | 73 | | | 14 |
| B3 | 12 | 88 | | | 16 |
| B4 | 57 | | 43 | | 12 |
| B5 | 43 | | 57 | | 14 |
| B6 | 31 | | 69 | | 16 |
| B7 | 21 | | 79 | | 18 |
| B8 | 64 | | | 36 | 12 |
| B9 | 51 | | | 49 | 14 |
| B10 | 41 | | | 59 | 16 |

Examples 29-38

Physical Properties of Copolymers

Approximately 2 g of each of the blend examples of B1-B10 was mixed with 0.01 g of photoinitiator 1-651 in a small amber vial. Polymerized samples were generated and tested following the same method that was outlined in Test Method 1 above. The results are shown in table 8. In Table 8, "NO" means not observed and "NT" means not tested.

TABLE 8

Thermal Transitions and mechanical properties of Blend Polymers

| Example | Polymer | Molar Carbon Number Average | DSC Analysis Tc (°C.) | Tm (°C.) | Tg (°C.) | DMA Analysis Tg (°C.) | St. Mod @ 25 C. (MPa) | FWPH (°C.) |
|---|---|---|---|---|---|---|---|---|
| 29 | B1 | 12 | NO | NO | −75 | −58 | 6190 | 40 |
| 30 | B2 | 14 | NO | NO | −76 | −53 | 4800 | 44 |
| 31 | B3 | 16 | NO | NO | −75 | −52 | 4800 | 50 |
| 32 | B4 | 12 | NO | NO | −72 | −53 | 5200 | 36 |
| 33 | B5 | 14 | NO | NO | −70 | −53 | 5010 | 36 |
| 34 | B6 | 16 | NO | NO | −65 | −52 | 3650 | 37 |
| 35 | B7 | 18 | NT | NT | NT | NT | NT | NT |
| 36 | B8 | 12 | −30 | −23 | NO | NO | 4920 | NO |
| 37 | B9 | 14 | −21 | −12 | NO | NO | 5840 | NO |
| 38 | B10 | 16 | −15 | −6 | NO | NO | NT | NO |

Examples 39-68

Adhesive Properties of PSAs Based on Blend Monomer Formulations

PSA materials were generated using the blended preparatory examples (B1-B10) as the base monomer system in each formulation. For example 47.5 g of B1 was mixed with 2 g of hydroxyethyl acrylate, 0.5 g of acrylic acid, and 0.03 g of photoinitiator I-651. This mixture was "thickened" by partially curing the formulation under UV irradiation similar to Examples 12-28 above. Tackifier (Regalrez™ 1094, R-1094), crosslinker (XL-330), additional photoinitiator (I-651) were added at similar levels to Examples 12-28 and according to Table 9 below and allowed to mix overnight in amber vials. Each adhesive formulation was coated, cured, and tested following the same procedure outlined in Examples 12-28, as well as Test Methods 3-6. The results are shown in Table 9. In Table 9 "trans" means translucent.

TABLE 9

Adhesive Properties of Blend Polymers Before and After Aging

| Example | Monomer Blend | Molar carbon number average | R-1094 Tackifier loading (pph) | 180° Peel Performance Immediately after cure Visual | S. Steel (N/dm) | F | HDPE (N/dm) | F | Aging 70° C. for 1 week Visual | HDPE (N/dm) | F |
|---|---|---|---|---|---|---|---|---|---|---|---|
| 39 | B1 | 12 | 50 | Trans | 48 | af | 36 | af | Clear | 39 | af |
| 40 | B1 | 12 | 75 | Trans | 66 | t | 48 | t | Trans | 32 | t |
| 41 | B1 | 12 | 85 | Trans | 70 | t | 44 | t | Trans | 17 | t |
| 42 | B2 | 14 | 50 | Clear | 44 | af | 40 | af | Clear | 37 | af |
| 43 | B2 | 14 | 75 | Trans | 77 | cs | 63 | t | Clear | 60 | af |
| 44 | B2 | 14 | 85 | Trans | 81 | cs | 44 | t | Clear | 69 | af |
| 45 | B3 | 16 | 50 | Clear | 45 | af | 39 | af | Clear | 36 | af |
| 46 | B3 | 16 | 75 | Trans | 71 | cs | 68 | cs | Clear | 68 | pcs |
| 47 | B3 | 16 | 85 | Trans | 81 | cs | 66 | cs | Clear | 83 | pcs |
| 48 | B4 | 12 | 50 | Clear | 45 | af | 24 | af | Clear | 20 | af |
| 49 | B4 | 12 | 75 | Trans | 55 | pcs | 35 | af | Clear | 31 | af |
| 50 | B4 | 12 | 85 | Trans | 53 | pcs | 22 | cs | Clear | 7 | g |
| 51 | B5 | 14 | 50 | Clear | 42 | g | 24 | af | Clear | 22 | af |
| 52 | B5 | 14 | 75 | Trans | 64 | cs | 50 | pcs | Clear | 36 | af |
| 53 | B5 | 14 | 85 | Trans | 59 | pcs | 34 | cs | Clear | 37 | af |
| 54 | B6 | 16 | 50 | Clear | 41 | pcs | 27 | af | Clear | 24 | af |
| 55 | B6 | 16 | 75 | Clear | 63 | cs | 44 | pcs | Clear | 44 | af |
| 56 | B6 | 16 | 85 | Trans | 72 | cs | 55 | pcs | Clear | 43 | af |
| 57 | B7 | 18 | 50 | Clear | 38 | af | 26 | af | Clear | 24 | af |
| 58 | B7 | 18 | 75 | Clear | 68 | cs | 61 | cs | Clear | 51 | cs |
| 59 | B7 | 18 | 85 | Clear | 76 | cs | 68 | cs | Clear | 71 | cs |
| 60 | B8 | 12 | 50 | Clear | 41 | af | 22 | af | Clear | 18 | af |
| 61 | B8 | 12 | 75 | Trans | 57 | pcs | 34 | af | Clear | 33 | af |
| 62 | B8 | 12 | 85 | Trans | 60 | pcs | 37 | pcs | Clear | 18 | g |
| 63 | B9 | 14 | 50 | Clear | 36 | af | 22 | af | Clear | 16 | af |
| 64 | B9 | 14 | 75 | Trans | 66 | cs | 46 | pcs | Clear | 27 | af |
| 65 | B9 | 14 | 85 | Trans | 61 | cs | 59 | pcs | Clear | 43 | af |
| 66 | B10 | 16 | 50 | Clear | 35 | pcs | 22 | af | Clear | 18 | af |
| 67 | B10 | 16 | 75 | Trans | 60 | cs | 49 | pcs | Clear | 36 | af |
| 68 | B10 | 16 | 85 | Trans | 70 | cs | 66 | pcs | Clear | 48 | af |

In general, the initial solubility of the low polarity Regalrez™ 1094 (R1094) tackifier with the blended composition was slightly worse compared to PSA formulations based on non-blended Guerbet acrylates. However, solubility of the tackifier in the blended systems for nearly every molar carbon number average grouping did improve after aging the PSA samples at 70° C. for one week. Similar to the non-blended systems (Examples 12-28), blended systems whose molar carbon number average was greater than 12 demonstrated good compability with the Regalrez™ 1094 tackifier after aging.

Regarding adhesive peel performance, blended formulations composed primarily of the $C_8$ (CM 2) and $C_{18}$ (GM 4) based acrylates were similar or slightly above formulations based on the single alkyl monomer of the same molar carbon number average. However, as the lower alkyl acrylate component (CM 2) is increased in concentration and blended with higher alkyl acrylates $C_{24}$ (GM 6) or $C_{32}$ (GM 8), the adhesive peel performance decreases generally even though the molar carbon number average is kept constant at 12, 14 or 16.

Examples 69-74 and C20-C21

Adhesive transfer tape made of GM 1 and GM 4

In examples 69-74 transfer tapes (2 mils or 51 microns coating thickness) with a 2 mil aluminum backing were made in the same way as Examples 12-28, except the monomer composition, formulated with Arkon™ P90 hydrocarbon tackifier (Arakawa Chemical, Chicago, Ill.), was coated between two transparent release liners, cured, and transferred to a primed PET liner. The monomer composition is shown in Table 10. 90 Degree Peel was tested using Test Method 7 against high density polyethylene (HDPE), polypropylene (PP) and stainless steel (SS) panels. 70° C. static shear were tested using Test Method 6. The adhesive tapes were tested against 3M™ brand 6032 and 9442 adhesive tapes. "HEA" is hydroxyethyl acrylate and "AA" is acrylic acid. "#2 bond" refers to a failure mode where the adhesive/backing bond fails. The results were shown in Table 10.

TABLE 10

Adhesive Transfer Tapes

| | | | | Tape 90 Degree Peel Performance (N/dm) | | | |
|---|---|---|---|---|---|---|---|
| | Adhesive Composition | | Dwell | | | | |
| Example | Monomer | Arkon P90 (pph) | (minutes, hours or days) | HDPE | PP | SS | 70 C. Shear (min) |
| 69 | GM1/AA/HEA = 95/1/4 | 60 | 15 min RT | 43 | 60 | 78 | 10000+ |
| | | | 24 hr RT | 46 | 67 | 101 | |
| | | | 72 hr RT | 48 | 70 | 99 | |
| | | | 7 D 70 C. | 46 | 77 | 95 | |
| 70 | GM1/AA/HEA = 95/1/4 | 70 | 15 min RT | 47 | 67 | 78 | 10000+ |
| | | | 24 hr RT | 59 | 68 | 83 | |
| | | | 72 hr RT | 47 | 77 | 94 | |
| | | | 7 D 70 C. | 62 | 85 | 108 | |
| 71 | GM1/AA/HEA = 97/1/2 | 70 | 15 min RT | 45 | 67 | 71 | 1581 |
| | | | 24 hr RT | 51 | 66 | 76 | |
| | | | 72 hr RT | 51 | 70 | 83 | |
| | | | 7 D 70 C. | 55 | 77 | 110 | |
| 72 | GM1/AA = 99/1 | 70 | 15 min RT | 58 | 131 | 110 | #2 bond |
| | | | 24 hr RT | 100 | 108 | 107 | |
| | | | 72 hr RT | 94 | 120 | 106 | |
| | | | 7 D 70 C. | 66 | 87 | 131 | |
| 73 | GM4/AA/HEA = 95/1/4 | 60 | 15 min RT | 100 | 101 | 108 | #2 bond |
| | | | 24 hr RT | 105 | 84 | 98 | |
| | | | 72 hr RT | 107 | 97 | 107 | |
| | | | 7 D 70 C. | 95 | 55 | 92 | |
| 74 | GM4/AA/HEA = 95/1/4 | 70 | 15 min RT | 63 | 65 | 127 | #2 bond |
| | | | 24 hr RT | 93 | 94 | 98 | |
| | | | 72 hr RT | 102 | 91 | 100 | |
| | | | 7 D 70 C. | 87 | 105 | 92 | |
| C20 | 3M 6032 | | 15 min RT | 18 | 26 | 59 | 66 |
| C21 | 3M 9442 | | 15 min RT | 25 | 26 | 72 | 7219 |

The peel adhesion data in Table 10 show the adhesive tapes have superior adhesion to low surface energy substrates (HDPE & PP) and high energy substrates (SS) as well as good temperature shear in comparison to the commercial acrylic tapes on the market.

Examples 75-76 and Comparative C22

Adhesive Foam Tape

Adhesives (2 mils or 51 micron coating thickness) were prepared in the same way as Example 69-74 but with the monomer composition shown in Table 11. The adhesive was then laminated to an acrylic foam (42 mils or 1.07 mm) and tested against the indicated substrates. The backing used for peel testing is an aluminum foil (5 mils or 127 microns). "HEA" is hydroxyethyl acrylate, "AA" is acrylic acid, "MA" is methyl acrylate and "IOA" is isooctyl acrylate. Foam tapes made of this invention demonstrate the unique feature of very higher adhesion to both low and high surface substrates compared to a conventional IOA-based adhesive on the same acrylic foam.

TABLE 11

| | Adhesive Foam Tapes | | | | | |
|---|---|---|---|---|---|---|
| | Foam Tape | | Foam Tape 90° Peel Performance (N/dm) | | | |
| | | Arkon P90 | | | | |
| Example | Monomer | (pph) | Dwell time | PP | HDPE | PC | SS |
| 75 | GM1/AA/HEA = 95/1/4 | 60 | 15 min | 283 | 179 | 187 | 263 |
| | | | 72 hour | 265 | 219 | 251 | 25e4 |
| 76 | GM4/AA/HEA = 95/1/4 | 60 | 15 min | 213 | 181 | 189 | 216 |
| | | | 72 hour | 262 | 243 | 243 | 241 |
| C22 | IOA/MA/AA = 65/35/5 | 0 | 15 min | 51 | 44 | 51 | 291 |

The invention claimed is:

1. A pressure-sensitive adhesive composition comprising (co)polymers of:
   a) 51 to 99 parts by weight of an (meth)acrylic acid ester monomers of 2-alkyl alkanols wherein the molar carbon number average of said 2-alkyl alkanols is 12 to 32;
   b) 1 to 49 parts by weight of (meth)acrylate esters of $C_{1-12}$ alkanols;
   c) 0 to 15 parts by weight of an acid functional ethylenically unsaturated monomer;
   d) 0 to 10 parts by weight of a non-acid functional, ethylenically unsaturated polar monomer;
   e) 0 to 5 parts by weight of a vinyl monomer; and
   f) 0 to 5 parts by weight of a multifunctional (meth)acrylate;
   based on 100 parts by weight total monomer, and
   wherein the molar carbon number average of the alkanols of the a) and b) (meth)acrylic acid esters is 12 to 32.

2. The pressure sensitive adhesive of claim 1 wherein the molar carbon number average of the alkanols of the a) and b) (meth)acrylic acid esters is 12 to 20.

3. The pressure sensitive adhesive of claim 1 wherein the copolymer further comprises acid monomer units.

4. The pressure sensitive adhesive of claim 1 wherein the copolymer further comprises non-acid polar monomer units.

5. The pressure sensitive adhesive of claim 1 further comprising a tackifier.

6. The pressure sensitive adhesive of claim 5 comprising 20 to 150 parts of said tackifier, relative to 100 parts of said (meth)acrylate ester (co)polymer.

7. The pressure sensitive adhesive of claim 5 wherein said tackifier is selected from hydrogenated rosin resins, hydrogenated and esterified rosin resins, hydrogenated terpene resins, aliphatic petroleum resins, aromatic petroleum resins, and alicyclic petroleum resins.

8. The pressure-sensitive adhesive of claim 1 wherein the 2-alkyl alkanols are derived from linear alkanols.

9. The pressure-sensitive adhesive of claim 1 wherein the 2-alkyl alkanol (meth)acrylate ester is of formula:

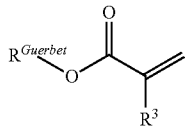

wherein $R^{Guerbet}$ is derived from a $C_{12}$-$C_{32}$ 2-alkyl alkanol, and $R^3$ is H or $CH_3$.

10. The pressure-sensitive adhesive of claim 9 wherein the 2-alkyl alkanol (meth)acrylate ester is of formula:

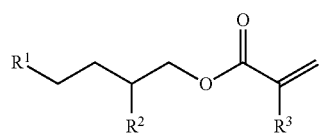

II wherein $R^1$ and $R^2$ are each independently $C_4$ to $C_{14}$ saturated, and branched or linear alkyl; and $R^3$ is H or $CH_3$.

11. The pressure-sensitive adhesive of claim 1 wherein the copolymer further comprises 5 to 45 parts by weight of a (meth)acrylic acid ester of a $C_1$-$C_{12}$ alkanol.

12. The pressure-sensitive adhesive of claim 1 wherein the copolymer further comprises 0.1 to 10 parts by weight of an acid functional ethylenically unsaturated monomer.

13. The pressure-sensitive adhesive of claim 1 wherein the copolymer further comprises 0.5 to 10 parts by weight of a non-acid functional, ethylenically unsaturated polar monomer.

14. The pressure-sensitive adhesive of claim 1 wherein the copolymer further comprises 0.05 to 1 parts of a multifunctional (meth)acrylate.

15. The pressure-sensitive adhesive of claim 1 wherein the copolymer has a $T_g$ of $\leq -20°$ C.

16. The pressure-sensitive adhesive of claim 1 further comprising a crosslinking agent.

17. A pressure-sensitive adhesive article comprising a coating of the adhesive of claim 1 on a backing.

* * * * *

UNITED STATES PATENT AND TRADEMARK OFFICE
CERTIFICATE OF CORRECTION

PATENT NO.         : 8,137,807 B2                                    Page 1 of 1
APPLICATION NO.    : 12/732406
DATED              : March 20, 2012
INVENTOR(S)        : Jason D Clapper It is certified that error appears in the above-identified patent and that said Letters Patent is hereby corrected as shown below:

Column 2,
Line 64, delete "$C_{12}$" and insert -- $C_1$-$C_{12}$ --.

Column 10,
Line 57, after "backings" insert -- . --.

Column 11,
Line 11, after "backings" insert -- . --.

Column 12,
Lines 13 and 14, delete "crystallinity, temperature (TO," and insert -- crystallinity temperature ($T_c$), --.

Signed and Sealed this
Twenty-sixth Day of June, 2012

David J. Kappos
*Director of the United States Patent and Trademark Office*